July 11, 1933.   B. M. SHIPLEY   1,917,332
CASH REGISTER
Original Filed Jan. 19, 1924   5 Sheets-Sheet 1

Inventor
Bernis M. Shipley
By
Earl Benst
His Attorney

Inventor
Bernis M. Shipley
By
Earl Berist

His Attorney

July 11, 1933.  B. M. SHIPLEY  1,917,332
CASH REGISTER
Original Filed Jan. 19, 1924   5 Sheets-Sheet 3
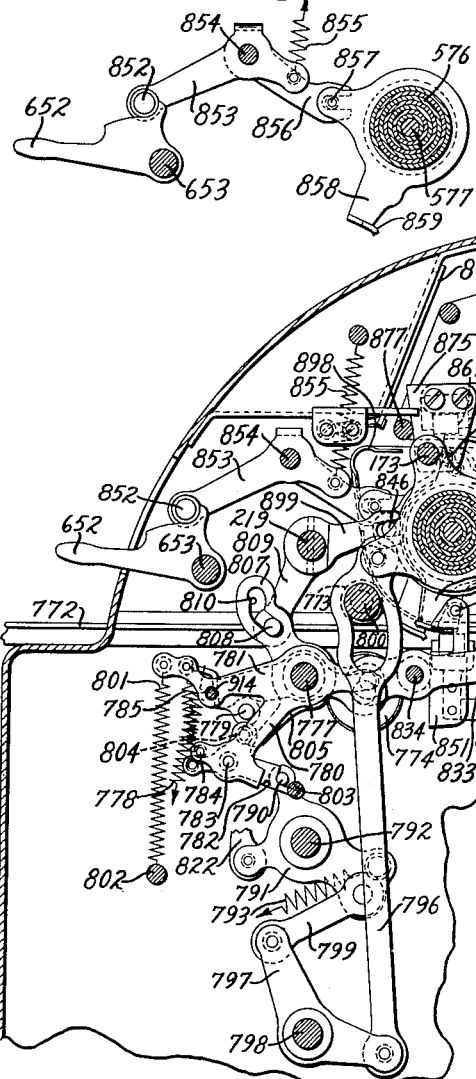
FIG. 6
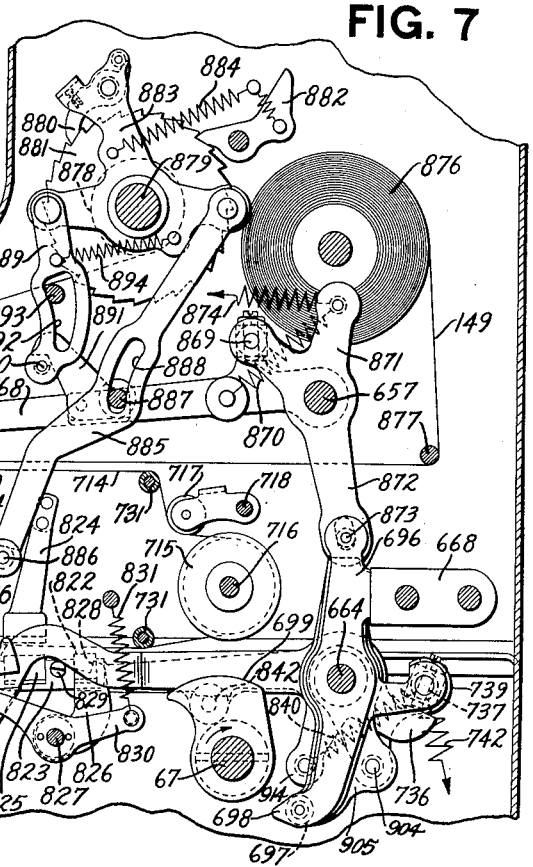
FIG. 7
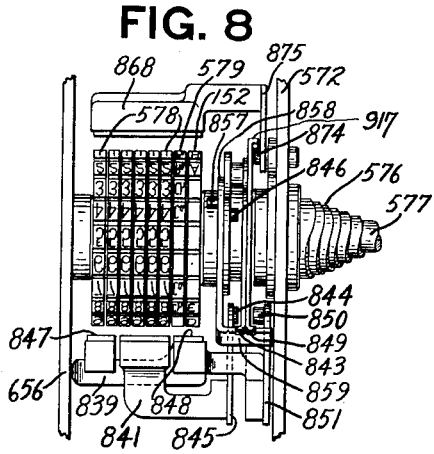
FIG. 8
FIG. 9
FIG.10
Inventor
Bernis M. Shipley
By
Earl Beust
His Attorney July 11, 1933. B. M. SHIPLEY 1,917,332
CASH REGISTER
Original Filed Jan. 19, 1924 5 Sheets-Sheet 4
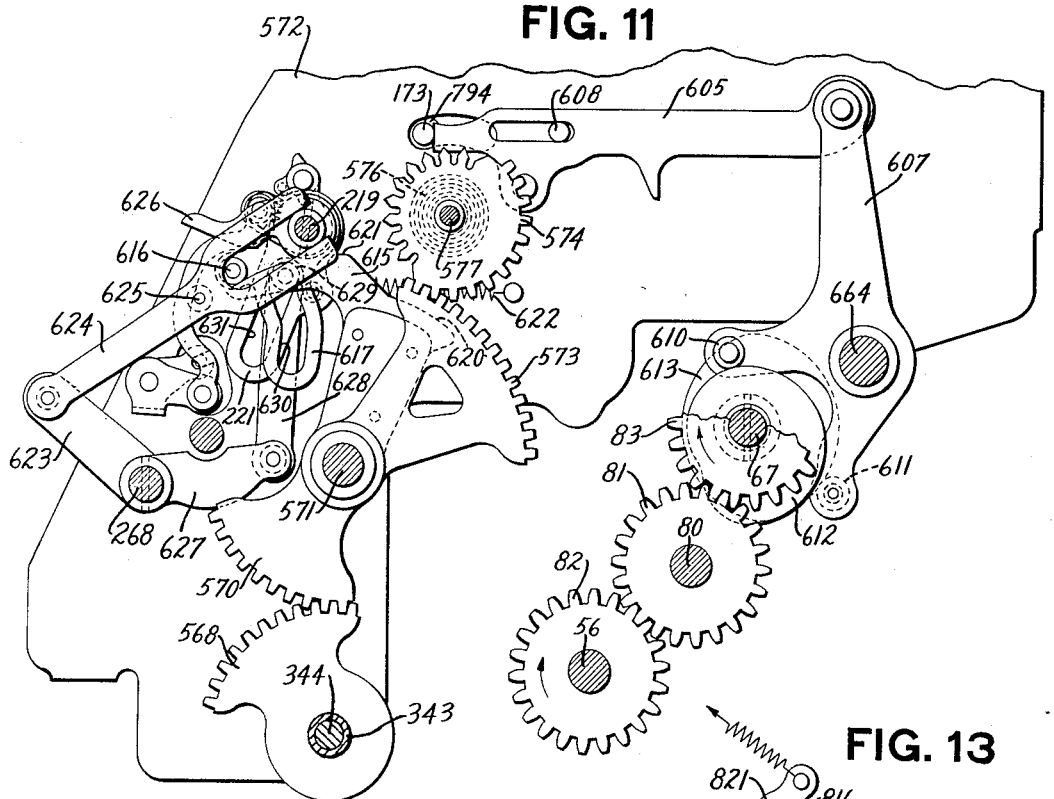
FIG. 11
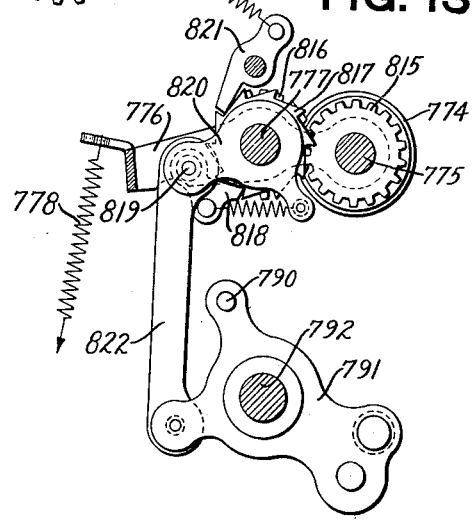
FIG. 13
FIG. 12
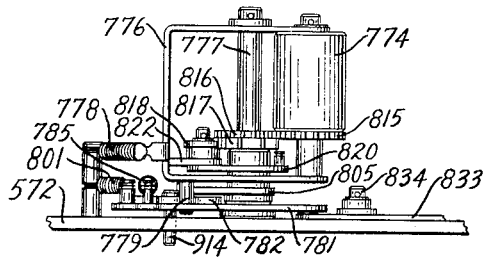
FIG. 14 FIG. 15
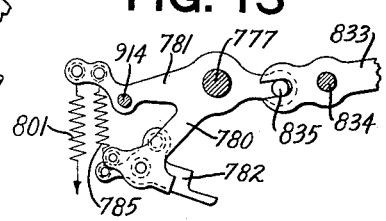
Inventor
Bernis M. Shipley
By
Karl Beust
His Attorney July 11, 1933.  B. M. SHIPLEY  1,917,332
CASH REGISTER
Original Filed Jan. 19, 1924  5 Sheets-Sheet 5
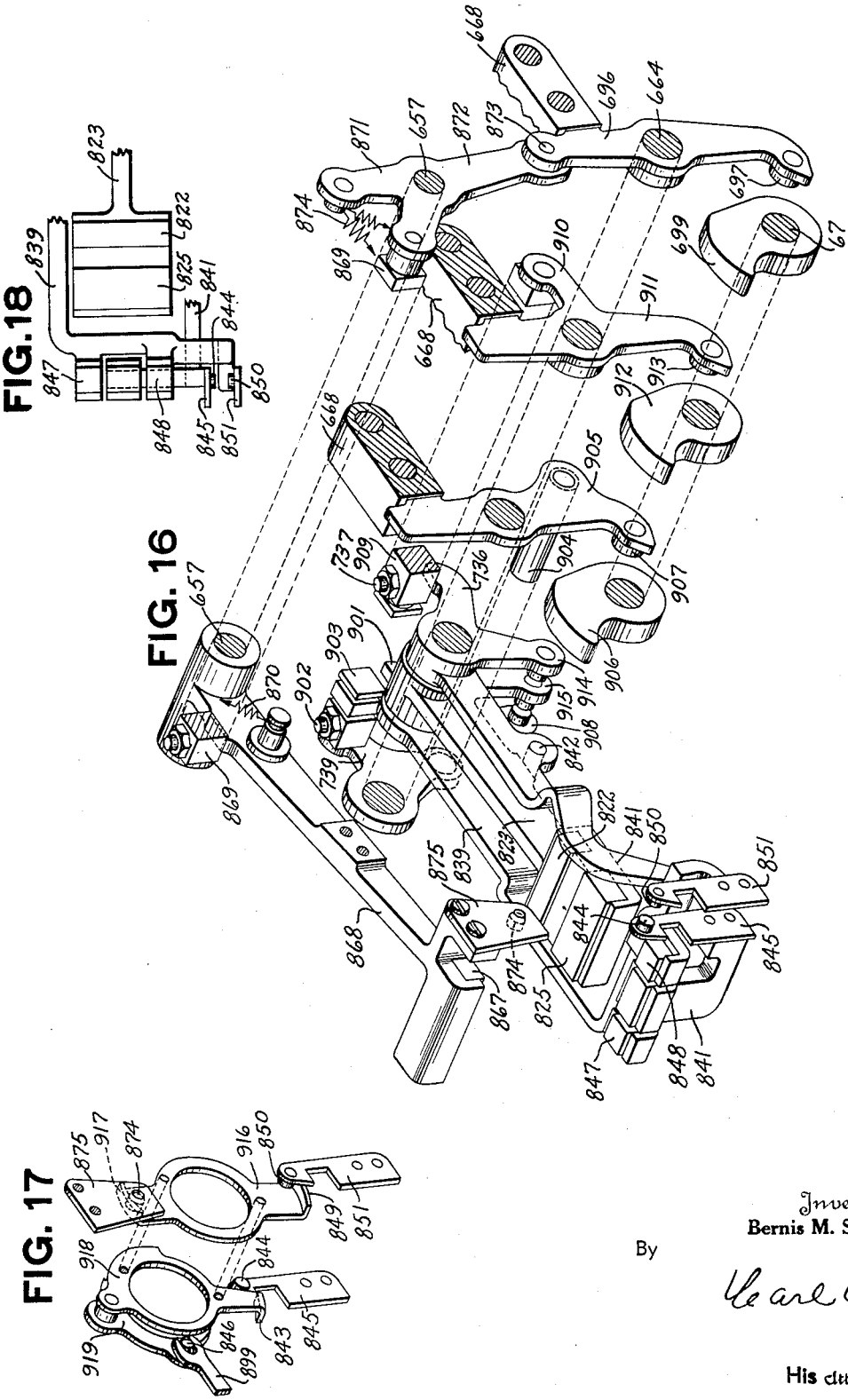
Inventor
Bernis M. Shipley
By
Carl Benet
His Attorney Patented July 11, 1933

1,917,332

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Original application filed January 19, 1924, Serial No. 687,305. Divided and this application filed May 21, 1930. Serial No. 454,319.

This invention relates to printing mechanisms and controls therefor which are especially adapted to be used in connection with machines of the type shown and described in the co-pending application of B. M. Shipley, Serial No. 687,305, filed January 19, 1924, (now Patent No. 1,865,147, issued June 28, 1932), of which the present application is a division.

One object of this invention is to provide a novel mechanism adapted to print upon and control the feeding of an insertable slip.

Another object of this invention is to provide a novel means under the control of a total control device, to control the slip feeding devices.

A further object of this invention is to provide a differential mechanism to variously control the slip feeding devices.

Another object of this invention is to provide an adjustable feeding roller which is movable into and out of functioning position, in combination with a plurality of manipulative devices and a total control means to determine the effectivity of such feeding roller.

A more specific object of this invention is to provide feeding means movable into and out of functioning position, in combination with impression means and means operable to permit the feeding means to move into functioning position during the first part of an operation, and to move it out of functioning position during the latter part of an operation, whereupon the movement of the feeding means into functioning position disables a part of the impression means during a subsequent operation.

Another specific object of this invention is the provision of mechanism mentioned in the last named object, in combination with a plurality of manipulative means for controlling the functioning of the feeding means and the effectivity of the impression means.

A further object of this invention is to provide a novel feeding mechanism associated with a record strip, in combination with impression means and means controlled thereby for disabling the feeding means.

A more specific object is to provide means for automatically disabling the record strip feeding means when the impression hammer mechanism is disabled.

A still further object of this invention is to provide a novel printing mechanism adapted to print upon a record strip, said mechanism including feeding and impression means and a novel driving mechanism for the feeding means, in combination with mechanism on the impression means to control the driving means for the feeding mechanism.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings

Fig. 6 is a detail view of the manual control for the impression hammer associated with the detail or record strip.

Fig. 7 is a side elevation, partly in section, showing generally the mechanism for printing upon an insertable slip and the detail or record strip.

Fig. 8 is a detail front elevation of the type wheels and the impression hammers and controls therefor.

Fig. 9 is a facsimile of an insertable slip printed by the mechanism shown herein.

Fig. 10 is a facsimile of a portion of the record strip.

Fig. 11 is an elevation, partly in section, showing a part of the type wheel setting mechanism, the upper or record strip impression control, and the mechanism shown in Figs. 2 and 3, with the parts in the positions which they assume at the end of the entry of a single item transaction.

Fig. 12 is a detail top plan view of the slip feeding roller and impression hammer controls.

Fig. 13 is a detail view of the slip feed and tension mechanism.

Figs. 14 and 15 are detail views of a part of the feed roller control.

Fig. 16 is a perspective of the type hammers and their operating mechanism.

Fig. 17 is a perspective of parts of the hammer disabling mechanism.

Fig. 18 is a plan view of the item and total hammers.

In general

The mechanisms constituting this divisional application are particularly for the purpose of producing an itemized sales slip, that is, the several items of a multiple item transaction are printed upon an inserted sales slip, and after all of the sub-items for any one transaction have been entered in the totalizer in the machine, the totals of such items is also printed upon the sales slip. Along with the totals is printed the character designating the particular kind of transaction, that is, whether it is cash or charge, and also a letter designating the particular clerk who handled the transaction.

The mechanism of this divisional application is also well adapted to print the totals of each transaction upon a record strip. Such totals referring particularly to the totals of multiple item transactions.

On single item transactions, of course it is unnecessary to make a totalizing operation, and therefore, only one amount will be printed upon the inserted slip, at which time the character of the transaction, and also a character representing the clerk handling that transaction, is printed.

There is also printed on the insertable slip other data, such as the date and consecutive number of the transaction, which mechanism, however, is not shown in this application, and for a description thereof reference may be had to Letters Patent of the United States, No. 1,817,883, issued July 20, 1931, to the same inventor. All amounts representing single item transactions are also printed upon the record strip.

The totalizers and the amount differential mechanism for controlling the amounts of single item transactions and multiple item transactions are not shown in this application, and for a disclosure and description thereof reference may be had to the parent application, Serial No. 687,305.

Of the totalizing mechanism used in this class of machine it is necessary to show herein only the total lever and the mechanism controlled thereby for causing the main drive shaft of the machine to make two cycles of operation during totalizing operations.

The invention, in the embodiment disclosed in this application, is especially adapted for use in places of business where it is desirable to print itemized sales slips which may be given to the customer or sent along with the customer's order, as the occasion demands; the printed record strip being retained in the machine so that the proprietor may at all times have a complete record of all transactions that have occurred during the day.

Operating mechanism

The machine with which the present invention is adapted to be used may be operated either by hand or by an electric motor. An electric motor of a well known type, illustrated and described in Letters Patent of the United States, No. 1,144,418, granted to C. F. Kettering and W. A. Chryst on June 29, 1915, is generally used when it is desired to have the mechanism driven electrically instead of manually.

Figure 5:
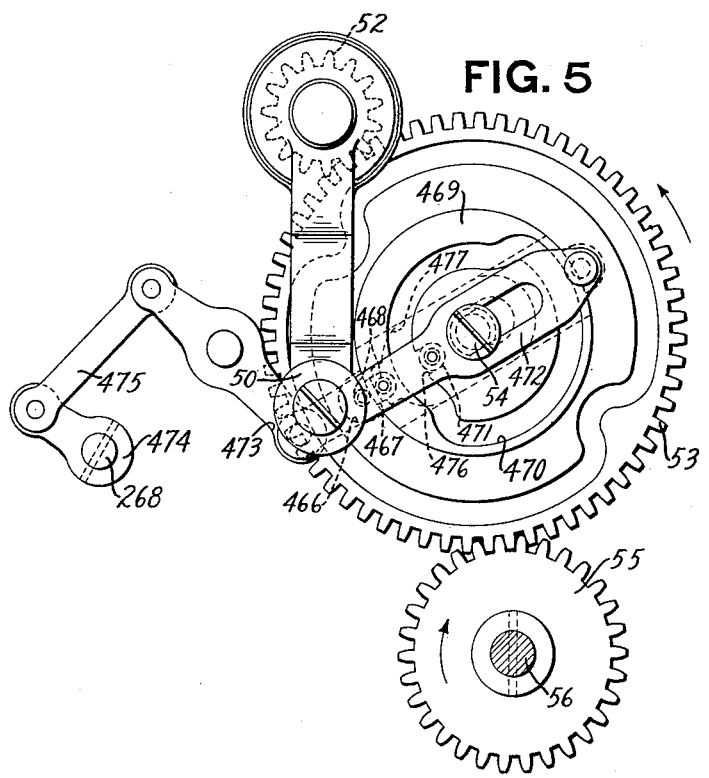
Fig. 5 is a detail showing the main drive shaft and the mechanism controlled by the total lever for operating the drive shaft two cycles during a totalizing operation.

When operating manually, the machine is provided with a handle 50 (Fig. 5) connected to a gear 52 meshing with a gear 53, which in turn meshes with a gear 55 secured to the main drive shaft 56. The ratio of the gears 52, 53 and 55 is such that two turns of the handle 50 rotate the gear 53 one-half turn and drive the gear 55 and operating shaft 56 one complete turn in a clockwise direction. On totalizing operations the handle 50 is turned four times in a clockwise direction, whereupon the gear 53 is rotated through a full 360° cycle, thus giving the shaft 56 two full turns in a clockwise direction.

Keyboard

The keyboard mechanism of the machine with which the present invention is adapted to be used, is substantially the same as that shown and described in the previously mentioned patent of B. M. Shipley, No. 1,817,883, and also in the United States patents granted to W. A. Chryst, No. 1,230,864, on June 26, 1917, and to F. L. Fuller, Nos. 1,242,170 and 1,394,256, dated October 9, 1917 and October 18, 1921, respectively.

The Letters Patent of the United States, No. 1,619,796, granted to B. M. Shipley (the present inventor) on March 1, 1927, also shows key banks, and particularly the amount key banks, of the construction used in machines with which the present invention is adapted to be used.

Figure 1:
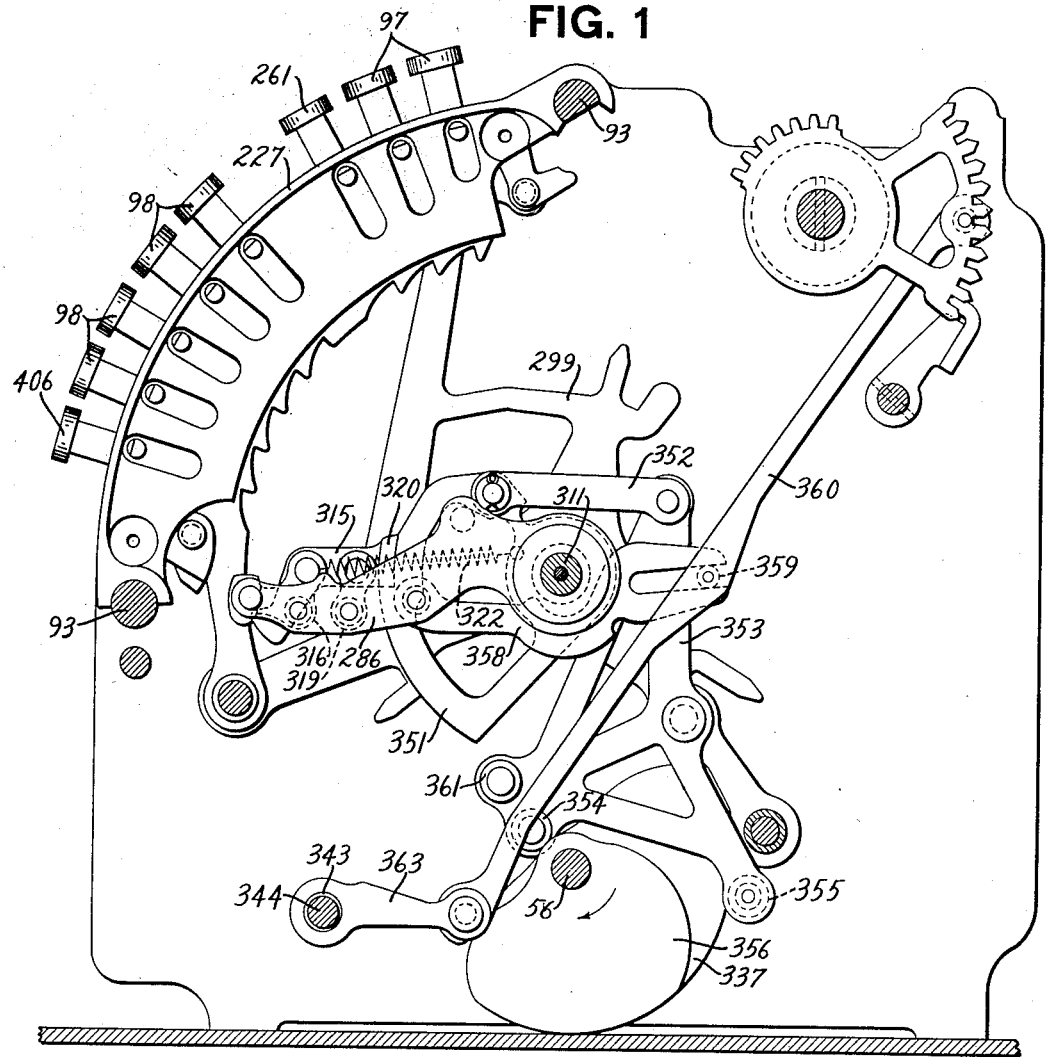
Fig. 1 is a side elevation of the transaction bank of keys, which bank of keys includes both single and multiple item control keys.

Only so much of the keyboard as is necessary to effect a control over the insertable slip printing and feeding devices is shown in the present divisional application, that much being illustrated in Fig. 1.

The two upper keys 97 are operated, one or the other as the occasion demands, for multiple item transactions. The four upper keys 98 of the lower group are what is known as single item keys, any one of which may be operated to set the machine for single item transactions. The lower key 406 is the usual "No sale" key. The lower key 261 of the upper group is what is known as the release key, and may be operated to release any depressed key 97 or 98. These keys are all mounted in a key frame 227 supported by the cross rods 93, which cross rods extend between the side frames of the machine.

In entering a "plural item" transaction, one of the keys 97 is depressed and locked in its depressed position until the total lever has been moved to take the total of the several items.

When a "single item" transaction is to be entered, one of the keys 98 is depressed and it is also held in its depressed position at the end of the entry of such transaction.

Differential mechanism

The only differential mechanism shown in this divisional application is that associated with the single and multiple item transaction keys. The differential mechanisms associated with the amount keys are substantially the same as those shown in the above mentioned patents, and it is not thought necessary to show or describe such mechanisms here as they are not directly involved in the subject matter claimed herein.

The mechanism associated with the single and multiple item keys, which mechanism, under control of those keys, determines and controls certain specific functions of the feeding and printing mechanisms associated with the inserted slip, will now be described.

Pivoted on a hub 311 (Fig. 1), which hub is carried by one of the several differential hangers 299 used in machines of this type, is a differentially adjustable arm 286, and this arm carries, by means of a link 319 and bell crank 316, the usual latch 315 having a foot 320 normally resting on a shoulder of a driver 351 also pivoted on the hub 311. The foot is maintained in engagement with the driver 351 by a spring 322. The driver 351 is moved a definite distance, first clockwise and then counter-clockwise, by a pair of cams 356 and 357 which cooperate with rollers 354 and 355 of a lever 353 connected by a link 352 to the driver 351.

As the driver is moved clockwise the latch 315, being in engagement with the shoulder of said driver, carries the differentially adjustable arm 286 clockwise until the forward end of the bell crank 316 contacts the inner end of a depressed key, which contact effects the withdrawal of the latch from the driver and consequent stopping of the arm 286 in a manner which is well known and fully illustrated and described in several of the above mentioned patents, and both of the above mentioned applications.

As the driver 351 returns to its normal position and the shoulder thereof reaches a position opposite the foot 320 of the latch 315, the spring 322 draws the latch back into the position shown to again couple the differentially adjustable arm 286 with its driver 351. Also connected to the differential arm is the usual beam 358 which is bifurcated to straddle the stud 359 on a link 360, the lower end of which is pivoted to an arm 363 secured to a sleeve 343 on a shaft 344.

As the differential arm is adjusted clockwise from the position shown in Fig. 1, the beam is rotated around the hub 311, consequently moving the link 360 downwardly to set the arm 363 and sleeve 343 in a position corresponding to that determined by the depressed key. To insure such positive positioning the lever 353 carries a roller 361 which contacts the under side of the beam as the lever 353 nears the limit of its clockwise movement. This beam mechanism is also well known, and is fully described in several of the above mentioned patents.

The upper end of the link 360 is connected to an indicator actuating mechanism which is not shown in this application as it has no particular relation to the invention claimed herein.

Total lever and controlling devices

Figure 4:
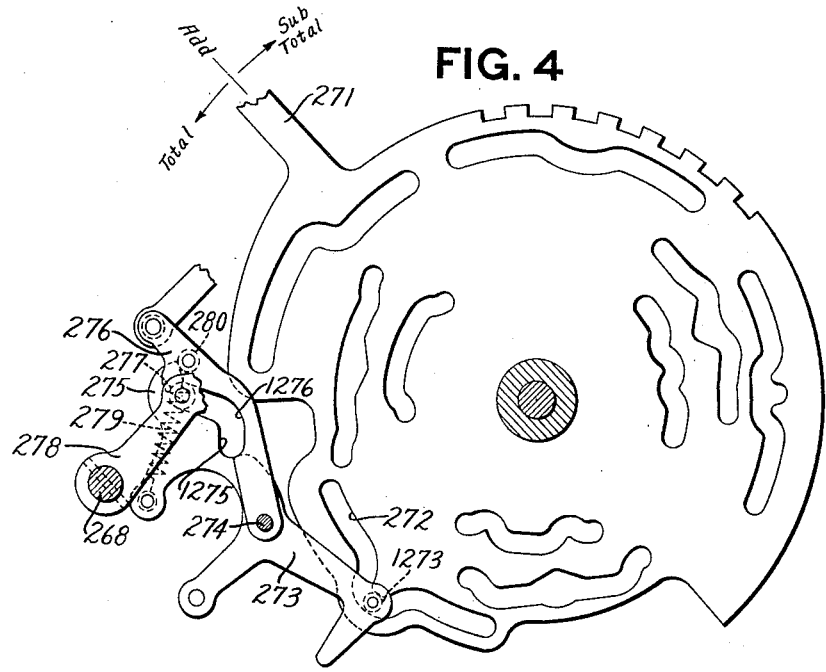
Fig. 4 shows the total lever and a part of the mechanism controlled thereby, the latter mechanism being used in effecting two cycles of operation of the main shaft during totalizing operations.

As will hereafter more full appear, the total lever 271 (Fig. 4) effects certain controls over the slip feeding devices, the slip impression devices and record strip impression devices. Its controls are effected by mechanism which operates only after the total lever has been moved out of its adding position. As above mentioned, during totalizing operations the main shaft 56 makes two complete rotations, and during this time certain connections are effected by the manipulation of the total lever to determine the effectivity of the feeding and impression devices.

Those connections which are moved and effected by the manipulation of the total lever, and which function during totalizing operations will now be described.

The total lever is provided with the usual slot 272 (Fig. 4) into which is entered a roller 1273 carried on one arm of a lever 273 pivoted at 274. The opposite arm 275 of the lever 273 has formed on one edge thereof a cam recess 1275. A link 276 pivoted at 274 and overlying the arm 275, has a complementary cam surface 1276 formed on its edge, so that the two surfaces 1275 and 1276 constitute a cam slot. A spring 279 causes a stud 280 on the link 276 to remain in contact with the arm 275 to hold the link 276 and arm 275 together in such a position that the surfaces 1276 and 1275 effectively act as a cam. This arrangement provides a flexible mechanism which will yield to prevent injury to the machine in case the shaft 268 is locked by a depressed key at the time the total lever 271 is shifted from its add position.

The shaft 268 has secured thereto an arm 278 carrying a roller 277 entered in the cam slot formed by the surfaces 1275 and 1276. When the total lever is adjusted out of its add position, either for total or sub-total purposes, the rocking of the lever 273 by the cam slot 272 causes a clockwise movement of the arm 278 and shaft 268.

Also secured to the shaft 268 is an arm 474 (Fig. 5) connected by a link 475 by a lever 473, which lever is pivoted to a pitman 472. This pitman carries a roller 471 normally resting in an offset notch 476 of a cam race 470 of a disk 469 pivoted on the stud 54 that supports the driving gear 53. The pitman 472 also has two pins 468, one projecting on either side of a flange 467 of a slide 477, which slide is located in a groove of the cam 469. This cam in turn, as is well known, turns in a recess in the gear 53.

The above described clockwise movement of the shaft 268 by the total lever, through the arm 474, link 475 and lever 473, draws the pitman toward the left (Fig. 5), whereupon the pins 468 move the coupling slide 477 so that the small left end thereof enters a notch 466 in the gear 53 to couple together the gear 53 and the cam 469. The movement of the pitman to the left also positions the roller 471 thereon into the main part of the cam slot 470.

With the parts in the positions as just mentioned, the machine is set ready for a totalizing operation, whereupon the handle 50 is given four complete clockwise rotations, and during this time the cam race 470 rocks the shaft 268 still further in a clockwise direction than it was moved by the manual setting of the total lever, and return said shaft to the position in which it was set by the movement of said lever. These movements of the shaft 268 are used for controlling the slip feed and impression devices in a manner to be described in detail. After the totalizing operation the total lever is moved back into its add position, and through the mechanism shown in Fig. 4, the shaft 268 is moved to its normal position, thus moving the pitman 472 back to the position shown in Fig. 5.

Printer

The printer is located on the left-hand side of the machine and prints on an inserted slip for both single and multiple item transactions, printing each item of the multiple item transactions. In both instances there is also printed the date and consecutive number of the transaction, the amount of each item entered in the transaction, and the total of the same when it is a multiple item transaction, characters representing the class of the transaction, the initial of the clerk and other selected data. In single item transactions it is not necessary to make a total print as in the multiple item transactions.

In addition to printing on an inserted slip, a total record strip 149 (Figs. 7 and 10) is printed and retained in the machine. This strip shows the amount of each single item transaction and the total of each multiple item transaction, together with the transaction and clerk's characters.

In entering multiple item transactions, all of the items for a given transaction must be of the same character, for example, cash and charge items cannot be printed on the same slip. If the customer purchases a number of articles for which he pays cash, and a number of articles which he has charged, two slips are used, one containing an itemized list and a total of the cash items, and the other slip an itemized list and total of the charge items. The character printed with the total on the slip shows which slip is for the cash articles, and which one is for the charge items.

The printing mechanism is operated generally through a printer drive shaft 67 (Fig. 11) which receives its movement through gears 82, 81 and 83 operated from the main drive shaft 56.

Nested sleeves 343 (Fig. 11), with the exception of the innermost one, are set under control of the amount keys in the manner fully illustrated and described in the parent application. Each sleeve has secured thereto a segment 568 meshing with a segment 570 pivoted on a stud 571 on the printer frame 572. Integral with each segment 570 is a segment 573 meshing with a segment 574. The several segments 574 are secured to nested sleeves 576 supported by a rod 577. Secured to the left ends of the sleeves 576, as viewed in Fig. 8, are the amount type wheels 578, transaction type wheel 579, and the clerks type wheel 152. Each type wheel has two sets of characters so that impressions may be made from both the upper and lower sides thereof. The upper side prints on the record strip, and the lower side on the inserted slip.

Slip printer

Fig. 9 is a facsimile of an itemized sales slip designated as 771, which is printed after being inserted in the mechanism shown. Said slip is placed on table 772 (Fig. 7) and between feed rollers 773 and 774 which are adapted to feed the slip toward the rear once at every operation of the machine, each item being printed on the slip. The slip is placed in the machine with the top edge toward the rear of the machine. The total of the items of the transaction, together with a character representing the kind of transaction and the initial of the clerk are also printed.

*Single item transaction operation of slip feed roller*

The slip feeding roller 774 is normally in an ineffective position, thus allowing the insertion of the sales slip between the rollers before the operation of the machine.

The feed roller 774 (Figs. 7, 12 and 13) is freely mounted on a rod 775 carried in a yoke 776 pivoted on a stud 777 on the printer frame 572. The feed roller 774 is retained in its normal position against the tension of a spring 778 by a pin 779 projecting from the yoke 776 and contacting an arm 780 on the lever 781 pivoted on the stud 777. The arm 780 carries a spring tensioned pawl 782 pivoted on a stud 783, the pawl being normally held in engagement with a pin 784 by a spring 785. The right hand end of the pawl is formed with a shoulder to engage a pin 790 of a lever 791 pivoted on a stud 792 in the printer frame. As the lever 791 moves clockwise by means to be hereinafter described, the lever 781 and feed roller yoke 776 are moved counter-clockwise by the spring 778 to place the feeding roller 774 in effective position with its companion roller 773.

The lever 791 is oscillated at each operation of the machine by a spring 793 (Fig. 7) and a slide 605 (Fig. 11). The slide 605 is pivoted to a lever 607 carrying rollers 610 and 611 cooperating with cams 612 and 613 on the printer drive shaft 67. The lever 607 is pivoted on a rod 664. The slide 605 is guided by the pin 608.

The spring 793 moves the lever 791 clockwise, and the slide 605 moves said lever counter-clockwise by engaging the pin 173 on a lever 794 freely mounted on the sleeves 576 (Fig. 7). This lever 794 is connected by link 796 to a lever 797 pivoted on the stud 798 on the printer frame. The upper end of the lever 797 is connected by a link 799 to the lever 791. The elongated opening in the lever 796 provides a working clearance around the feed roller stud 800.

During single item transactions the roller 774 is moved upwardly to contact the inserted slip with the upper feed roller 773, and said feed roller 774 is returned to its normal position during that single item transaction.

The mechanism for moving the roller 774 into its effective position during single item transactions will now be described.

As the lever 791 (Fig. 7) moves clockwise a spring 801 attached to the lever 781 and to a pin 802 in the printer frame, moves the lever 781 counter-clockwise to raise the roller 774 into its effective position. During this time the shouldered pawl 782 follows the stud 790 of the lever 791. During this counter-clockwise movement of the lever 781, a pin 804 carried by the pawl 782 is held in contact with an arm 805, which arm is moved at this time counter-clockwise by means to be hereinafter described, thus permitting the pawl 782 to follow and remain in contact with the stud 790 until the roller 774 contacts the slip and presses it against the upper feed roller 773.

After the printing has taken place, and as above mentioned, the lever 791 is rocked counter-clockwise to its normal position, whereupon the stud 790 is moved back into contact with the shouldered pawl 782, thus rocking the lever 781 clockwise to return the roller 774 to the position shown in Fig. 7.

The means for rocking the arm 805 counter-clockwise so that the pawl 782 can be moved to the right as just mentioned will now be described.

This arm 805 is integral with a cam arm 807 pivoted on the stud 777. The cam 807 has a slot 810 into which is entered a pin 808 on an arm 809 secured to a rock shaft 219. This rock shaft is moved in a clockwise direction during a single item transaction by means to be hereinafter described, and when thus rocked the pin 808 through its cooperation with the cam slot 810 rocks the cam arm 807 and arm 805 counter-clockwise so that the pawl 782 and pin 790 may function as above described. At the end of a single item transaction the arm 805 and its integral cam arm 807 are left in the position to which they were moved during the single item transaction due to the fact that the shaft 219 is left in its moved position, whereupon the pin 808 is left in the upper part of the slot 810. Such position is shown in Fig. 14.

Figures 2, 3:
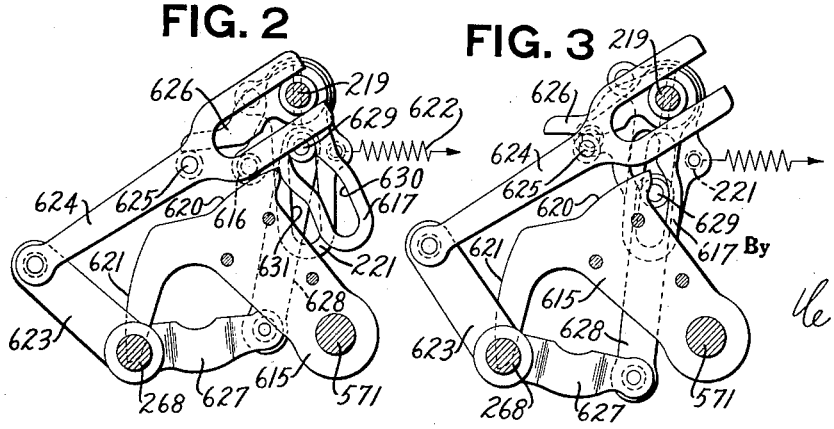
Fig. 2 is a detail view of the mechanism for controlling the feeding roller for the slip.
Fig. 3 is a detail view of the same mechanism that is shown in Fig. 2, with the parts in the positions which they assume after the total lever has been moved preparatory to taking a totalizing operation.

The means for moving the shaft 219 will now be described. Referring now particularly to Figs. 1, 2 and 11, it will be recalled that the arm 363 and sleeve 343 (Fig. 1), are set under control of the multiple item keys 97 and single item keys 98 of the transaction bank.

The segments 568 and 570 (Fig. 11) are connected with the opposite end of sleeve 343 and are set under control of the transaction bank of keys of Fig. 1. Secured to the segments 570 and 573 is a cam arm 615, which, being secured to such segments, is of course, adjusted under control of the single item keys 98 and multiple item keys 97. The outer edge of the cam arm 615 cooperates with a roller 616 on an arm 617 loose on the shaft 219. This cam arm 615 has a low edge 620 and a high edge 621. Whenever any of the single item keys 98 are depressed the high edge 621 contacts with the roller 616 and holds said roller in the position shown in Fig. 11. The arm 617 which carries the roller 616 has a cam slot 630 through which projects a roller 629 carried by a link 628, the purpose of which will be hereinafter described.

This roller 629 also projects through a straight slot 631 of an arm 221 which is secured to the shaft 219. A spring 622 secured to the arm 621 and to the frame of the machine tends to move the arm 221 counter-clockwise, but due to the fact that the roller 616 is cooperating with the high edge 621 of the arm 615, such movement of the arm 221 is prevented, and consequently, the shaft 219 is held in the position shown in Figs. 11 and 14. Other positions of this shaft are shown in Figs. 2 and 3, these positions and the means for moving the shaft to such positions, will be hereinafter described; but it might be well to state here that Fig. 2 shows the shaft and the mechanism associated therewith, including the cam arm 615, to be in the position to which they were left at the end of an entry of an item of a multiple item transaction, and in Fig. 3 they are shown in the position which they assume when they are moved by the total lever preparatory to taking a total either of a multiple item entry or a regular totalizing operation.

Due to the fact that the cam arm 615 is adjusted under control of the beam 358 (Fig. 1) it will remain in the position to which it was left at the end of a single item transaction, whereupon the parts will be left in the positions shown in Figs. 11 and 14.

*Multiple item transaction operation of slip feed roller*

The operation of the slip feeding means during multiple item transactions will now be described. It will be recalled that during single item transactions the feed roller 774 is moved into its effective position to grip the slip, but that no feed takes place, the roller being removed from its gripping position just prior to the time the feeding operation occurs.

However, during multiple item transactions it is necessary that the feed roller, after it is moved into its effective position, remain in such position during the entry of all of the several items of a multiple item transaction, and that it be rotated after the printing of each item to line space the items one from the other.

Since the shaft 219 effects a control of the roller 774 as determined by the transaction keys by controlling the position of the arm 805 and cam arm 807 (Fig. 7), such positioning of the last mentioned arms will be described before the actual moving of the roller.

Referring now particularly to Figs. 1, 2, 7 and 11, it will be clear that when one of the transaction keys 97 is depressed, the differentially adjustable arm 286 will be moved until the latch 315 is disconnected from the driver in one of the two positions depending upon which of the keys 97 has been depressed. Such movement of the arm 286 through the beam 358 rocks the arm 363 of Fig. 1 clockwise, which through the sleeve 343 and segments 568 and 570, rocks the cam arm 615 counter-clockwise from the position shown in Fig. 11 to the position shown in Fig. 2. As the cam arm 615 is thus rocked, when the roller 616 reaches the end of the high edge 621, the spring 622 rocks the arm 221 counter-clockwise from the position shown in Fig. 11 to the position shown in Fig. 2, and due to the fact that the pin 629 extends through the slot in the arm 221 and the slot in the arm 617, this latter arm is rocked from the position shown in Fig. 11 to the position shown in Fig. 2, whereupon the roller 616 contacts the low edge 620 of the cam arm 615.

Such movement of the arms 221 and 617 occasions a counter-clockwise movement of the shaft 219, whereupon the arm 809 is moved from the position shown in Fig. 14 to the position shown in Fig. 7, thus moving its pin from the upper part of the cam slot 810 to the low part thereof, and rocking the cam arm 807 and its integral stop arm 805 clockwise from the position shown in Fig. 14 to that shown in Fig. 7.

With the parts in such positions, as the lever 791 moves clockwise by means previously described, the pin 790 will disengage from the shoulder of the pawl 782, and at the same time the lever 781 will be moved counter-clockwise by its spring 801 until the lower end of the arm 780 of such lever is arrested by a pin 803 in the printer frame.

During such counter-clockwise movement of the arm 780, the pin 804 of the pawl 782 contacts the arm 805, which is now held in the position shown in Fig. 7, and therefore, the continued movement of the arm 780 in a counter-clockwise direction causes a rocking movement of the pawl 782 in a counter-clockwise direction, thus elevating the shouldered end of the pawl above the path of the pin 790, so that as the lever 791 returns counter-clockwise to its normal position, the pin 790 will move beneath the pawl 782 thus allowing the feeding roller to remain in feeding relation with the upper roller 773. The roller 774 remains in such position during the entry of all of the several items of a multiple item transaction, and after the printing of each item the roller is turned to feed the slip one step to line space the several impressions thereon.

The means for turning the roller 774 to feed the slip is shown in Figs. 12 and 13, and will now be described. Secured to the right-hand end of the roller 774 is a gear 815 meshing with a driving gear 816 freely mounted on the stud 777 and fastened to a ratchet wheel 817 actuated by a spring tensioned driving pawl 818 pivoted at 819 to an arm 820 also pivoted on the stud 777. As the lever 791 is rocked clockwise a link 822, connecting said lever with the arm 820, rocks the arm 820 clockwise (Fig. 13) thus drawing the pawl upwardly over one of the ratchet teeth, so that upon the counter-clockwise movement of the lever 791 to its normal position, the pawl 818 will turn the ratchet counter-clockwise and through the gear 816 turn the gear 815 and feed roller 774 in a clockwise direction. A spring-tensioned retaining pawl 821 prevents any retrograde movement of the roller 774 as the feed ratchet is moved over the teeth previous to the feeding movement thereof.

After the several items of the multiple item transaction have been entered and printed upon the slip, the operator, as has been previously described in the parent Patent No. 1,865,147, moves the total lever to the item total position to take the total from the totalizer and set it up on the type wheel so that it can be printed on the slip beneath the several items.

It will be recalled that during totalizing operations the main cam shaft 56 receives two rotations instead of one. It is during or near the end of the second rotation that it is desired to release the feed roller 774 and return it to its home position. This control of the feed roller is effected through the shaft 219 as determined by the position of the total lever. When the total lever is moved from its "add" to its "total" position the shaft 219 and parts associated therewith are moved from the position shown in Fig. 2 to that shown in Fig. 3. This movement is occasioned through the cam slot 272 (Fig. 4), the mechanism for rocking the shaft 268, and arm 623 (Figs. 2 and 3), fast to the shaft 268, a pitman 624, and an arm 626 which is pinned to the shaft 219. The clockwise movement of the shaft 268 by the movement of the total lever through the train of mechanism just described, rocks the arm 623 clockwise from the position shown in Fig. 2 to that shown in Fig. 3, whereupon the pitman 624 is moved to the right, and a roller 625 thereof, through its contact with the arm 626, rocks the shaft 219 from the position shown in Fig. 2 to that shown in Fig. 3. During such movement an arm 627 also fast to the shaft 268 moves the previously mentioned link 628 downwardly, whereupon the stud 629 through the cam slot 630 rocks the arm 617 clockwise from the position shown in Fig. 2 to that shown in Fig. 3, thus moving the roller 616 far enough away from the cam arm 615 so that it will not be affected thereby when the cam arm returns to its normal position during the first cycle of a totalizing operation.

The movement of the shaft 219 as just described by the total lever rocks the arm 809 (Fig. 7) from the position here shown to the position shown in Fig. 14, thus rocking the stop arm 805 from the position shown in Fig. 7 to that shown in Fig. 14. This movement occurs near the end of the first cycle of the totalizing operation. As the stop arm 805 is thus moved away from the pin 804 of the pawl 782, the spring 785 rocks the pawl clockwise while the pin 790 is in its right-hand position, that is, immediately after the lever 791 has reached the limit of its clockwise movement, thus positioning the shoulder of the pawl 782 in the path of the pin 790 so that upon the counter-clockwise movement of the lever 791 to its normal position, the pin 790 will contact the pawl 782 and rock the arm 780 and lever 781 clockwise to normal position, thus removing the roller 774 from the slip and returning said roller to its normal position.

*Item and total printer for inserted slip*

Two impression hammers 839 and 841 (Figs. 7, 8, 16 and 18), are used in printing the items and totals on the sales slip. Hammer 841 is used to print the items, while both are employed to print the totals, the hammer 839 carrying two impression blocks 847 and 848 (Fig. 8) to make impressions from the higher order numeral wheels and from the clerks and transaction wheels, and hammer 841 carrying one impression block to make impressions from the lower order numeral wheels.

These hammers are pivoted on rod 664 (Fig. 16), and have rearwardly extending arms 901 and 736. Arm 901 lies under and in contact with an adjusting screw 902 extending through a square stud 903 secured to one arm of a lever 739 pivoted on rod 664. A tie rod 904 is secured to the other arm of lever 739 and to a lever 905 also pivoted on rod 664. A cam 906 cooperates with a roller 907 on the lower end of the lever 905. A spring similar to the spring 840 (Fig. 7), secured to a stud on a depending arm 908, (Fig. 16), and to the square stud 903 holds the arm 901 in contact with the adjusting screw 902. A spring similar to spring 742, (Fig. 7), secured to the stud 903 and to a stationary part of the machine, holds the hammer 839 and levers 739 and 905 in the position shown in Figs. 7 and 16, where the upper end of lever 903 rests against a stationary block 668.

Arm 736 on hammer 841 lies under and in contact with an adjusting screw 737 extending through a square stud 909 secured to a rearwardly extending arm 910 of a lever 911 pivoted on the rod 664. A cam 912 secured to shaft 67 cooperates with a roller 913 on the lower end of lever 911 to move the same and the hammer 841. A spring 840, (Fig. 7) secured to a stud on the depending arm 914 of hammer 841 and to the square stud 909, holds the arm 736 in contact with the adjusting screw. A spring 742, (Fig. 7), secured to the square stud 909 and to a stationary part of the machine, holds the hammer 841 and the lever 911 in the position shown in Figs. 7 and 16, where the upper end of lever 911 rests against the block 668.

When the shaft 67 rotates clockwise, the cams 906 and 912 rock their respective levers 905 and 911 counter-clockwise, cocking the hammers 839 and 841. When the high portions of the cams move beyond the rollers 907 and 913, the spring described as similar to spring 742, and spring 742 return their respective levers 905 and 911 to their home position shown in Figs. 7 and 16. The momentum given the hammers by their rapid return causes them to move a distance against the tension of the spring described as similar to spring 840, and spring 840, after the levers 905 and 911, and the studs 903 and 909 have come to rest. This additional movement of the hammers causes the taking of the impression of the total.

Date and consecutive number and electro printer for inserted slip

The date and consecutive number at the top of the sales slip are printed by an impression block 822 (Figs. 7 and 16), carried by a hammer 823 pivoted on the rod 664 and lying between the hammers 839 and 841. The mechanism for printing the date and consecutive number, other than the impression hammer and its operating mechanism, is not shown here, as it is identical with that shown in the above mentioned Shipley Patent No. 1,817,883.

The hammer 823 also carries an impression block 825 to take impressions from an electro plate secured to a bracket 824 (Fig. 7).

The hammer 823 carries a depending arm 915 having a stud to which one end of a spring similar to spring 840 (Fig. 7) is attached. The other end of this spring is fastened to the square stud 903. The tension of this spring yieldingly holds the hammer 823 in contact with a stud 842 (Figs. 7 and 16) secured in a depending ear of hammer 841 and extending under hammer 823. The spacing of the impression blocks on the hammers 841 and 823 in relation to their type is such that the impression block on hammer 841 will strike its type when the impression blocks on the hammer 823 are still a short distance from their type. This necessitates a small additional movement of the hammer 823 over that of hammer 841 to effect an impression from hammer 823. The space traversed by such additional movement is necessary for disabling hammer 823 at certain times, as will hereinafter appear.

It is apparent that when the hammer 841 is cocked upon rotation of shaft 67, the spring fastened to arm 915 will cause hammer 823 to move downwardly with hammer 841, and upon the release and return of lever 911, stud 909, and hammer 841, the hammer 823 will be returned by the stud 842, and will receive sufficient momentum during the return movement to carry it the additional distance after the hammer 841 has struck its type. The hammer 823 is then returned to contact with the stud 842 by the tension of its spring.

Record strip printer

The record strip, as previously mentioned, is printed from the set of type on the upper half of the set of type wheels. Impressions are made on this strip by a platen 867 (Figs. 7 and 16) carried by impression hammer 868 pivoted on the stud 657. The hammer 868 is normally held by a spring 870, in contact with an adjusting screw mounted in a block 869 carried by an oscillating lever 871 pivoted on the stud 657. This lever 871 has an arm 872 with a slot into which projects a pin 873 carried by a lever 696 pivoted on the rod 664. A spring 874 normally holds the lever 696 in engagement with the block 668. The lower end of this lever 696 carries a roller 697 which cooperates with a cam 699 to operate the upper impression hammer. Contact of the cam 699 with the roller 697 rocks the lever 696 counter-clockwise to cock the hammer 868, and when the cam 699 passes off the roller the spring 874 throws the hammer 868 counter-clockwise with considerable force to cause the platen 867 to make an impression from the type wheels on the detail strip.

Disabling mechanism for the printing hammers

During the entry of items of a multiple item transaction, and during the first cycle of a totalizing operation, it is desirable to prevent the total hammer 839 and the record strip hammer 868 from operating. To accomplish this there is provided a flanged lever 916 (Figs. 7, 8, 16 and 17) pivoted on the outermost sleeve 576, and having an upper flange 917 and a lower flange 849. The flange 917 overlies a stud 874 secured to a plate 875 on the record strip hammer 868. The flange 849 lies under a stud 850 secured to a plate 851 on the end of the total hammer 839 (Figs. 8, 16 and 17). This lever 916 is rigidly secured to another flanged lever 918, as shown in Fig. 17, which in turn is secured to a ring 919, likewise pivoted on the outermost sleeve 576. Ring 919 carries a stud 846 (Figs. 7, 8, 14 and 17) lying within the forked end of an arm 899 of the lever 809 previously referred to.

During the entry of the items of a multiple item transaction the parts are in the position shown in the drawings, where the flanges 849 and 917 prevent the hammers 839 and 868 from being cocked, and consequently prevent an impression from being taken.

It will be recalled that when the total lever 271 is moved to take a total, the shaft 219 is rocked clockwise, and that during the second cycle of the ensuing operation it is given an additional clockwise movement. When shaft 219 is given its first clockwise movement, arm 899 moves ring 919 and levers 918 and 916 counter-clockwise. This movement is not sufficient, however, to move the flanges 849 and 917 beyond their respective studs 850 and 874. The flanges thus remain effective and prevent the hammers 839 and 868 from being cocked and taking an impression during the first cycle of the totalizing operation.

However, when the shaft 219 receives its second clockwise movement, during the first part of the second cycle, the flanges 849 and 917 are moved beyond their studs 850 and 874, allowing the hammers 839 and 868 to be cocked and to take an impression of the total of the multiple item transaction on the inserted slip and on the record strip.

It is also desirable to prevent the hammer 841, which prints the items and assists in printing the totals, from taking an impression during the first cycle of a totalizing operation. For this purpose a flange 843 (Figs. 8 and 17) is provided on the lever 918, normally lying beside a stud 844 secured to the plate 845 on the hammer 841. During the entry of items of a multiple item transaction the hammer 841 may be cocked and may take an impression unhampered by the flange 843, but upon movement of the total lever and the consequent clockwise rotation of shaft 219 preparatory to a totalizing operation, the flange 843 is moved under the stud 844 and prevents cocking of the hammer 841 during the first cycle of the ensuing totalizing operation.

When the shaft 219 receives its second clockwise rotation as above described, the flange 843 is moved beyond the stud 844 (to the right of the stud as seen in Fig. 17), allowing the hammer 841 to be cocked and to assist the hammer 839 in printing the total.

Another disabling mechanism is provided to prevent the taking of more than one impression by the "date, consecutive number and electro" hammer 823 during a multiple item transaction. This hammer is accordingly disabled after the first item of a transaction is entered, and remains so until the end of the totalizing operation following the entry of the items.

The mechanism for accomplishing this includes an arm 826 (Fig. 7) freely mounted on a stud 827 on the printer frame. The upper end of the arm 826 has a shoulder 828, which, as the arm moves counter-clockwise, will engage a flat-sided pin 829 projecting from the hammer 823. Secured to the arm 826 is a lever 830 having a spring 831 attached to its right-hand end which maintains the left-hand end in contact with the pin 832 carried by a lever 833 pivoted on a stud 834 supported by the printer frame. The left-hand end of the lever 833 is bifurcated (Fig. 15), to engage a pin 835 carried by the lever 781.

When the lever 781 is rotated counter-clockwise at the beginning of an operation, the arm 826 is moved to the left by the action of spring 831. This causes the forward edge of the arm 826 to rest against the pin 829, where it remains until the hammer 823 moves above the position shown in Fig. 7 to effect an impression, at which time the spring 831 will move the arm 826 under the pin 829 where it will stop when the shoulder 828 comes into contact with the pin.

As previously explained, the lever 781 will not be rotated clockwise until the end of the totalizing operation following the entry of the last item. This leaves the arm 826 under the pin 829 during the entry of the remaining items and during the totalizing operation, preventing the making of an impression during this interval.

It might be noted that when the arm 826 is under the pin 829, the hammer 823 is held in the space traveled by the hammer 823 after its actuating hammer 841 has struck its type wheels, preventing the pin 842 from striking the hammer 823 on the impression stroke of the hammer 841.

When the items have been entered and the total is being taken, the lever 781 is moved clockwise near the end of the second cycle, moving the arm 826 from beneath the pin 829. This allows the hammer 823 to drop down into its home position disclosed in Fig. 7, where it is capable of making an impression.

When it is desired to operate the machine without printing a sales slip, as may happen when taking a sub-total or grand total, the lower impression hammers 823, 841 and 839 are disabled by a manually operated device shown particularly in Fig. 6, where the parts are in their normal positions. A manipulative lever 652 pivoted at 653 has a cam edge engaging a roller 852 of a yoke 853 pivoted on a stud 854. Attached to one side of the yoke is a spring 855 which maintains the roller 852 in engagement with the lever 652. The opposite side 856 of the yoke is bifurcated to engage a pin 857 on a lever 858 pivoted on the sleeves 576. This latter lever has a flange 859 adapted to engage notches (Figs. 7 and 16) in the two arms 845 and 851 and disable the impression hammers when the lever 652 is moved clockwise to its operated position.

*Record strip feed*

The total record strip 149 (Fig. 7) is fed from a supply roll 876 around guide studs 877 and onto a receiving roll 878 freely mounted on a stud 879 supported in the printer frame. The strip is wound around the roll by a spring-pressed pawl 880 cooperating with a ratchet wheel 881 secured to the roll 878. A spring-pulled pawl 882 prevents a retrograde motion of said receiving roll.

The pawl 880 is carried on a three arm lever 883 pivoted on the stud 879, and moved clockwise by a spring 884. Pivotally mounted on one arm of the lever 883 is a link 885 extending downwardly to engage a pin 886 carried by the lever 794. As the lever 794 moves clockwise during each operation of the machine, the spring 884 will cause the ratchet pawl lever 883 to move clockwise, and when the lever 794 is returned to normal position by mechanism hereinbefore described, the ratchet pawl 880 will move the ratchet wheel counter-clockwise and move the record strip 149.

A pin 887 projecting from the printer frame projects into an elongated opening 888 in the link 885 to guide the lower end of said link.

A link 889 pivoted to another arm of the ratchet pawl lever 883, carries a flat sided pin 890 in its lower end to cooperate with an arm 891 secured to the impression hammer 868 to disable the record strip feeding mechanism on operations during which no impression is made on the strip by the hammer 868, that is, during the entry of items of a multiple item transaction and during the first cycle of totalizing operations. During these operations, as heretofore explained, the hammer is not raised, and the tension of spring 884, not being sufficient to raise the hammer, is prevented from rotating the lever 883 as the lever 794 rotates clockwise, due to the flat stud 890 being held by the arm 891. This prevents the pawl 880 from operating the ratchet 881.

The link 889 has an opening 892, the left-hand side of which contacts a pin 893 supported by the printer frame. The link is normally held in contact with the pin 893 by a spring 894. The left side of the opening 892 is formed so as to cause the pin 890 to move out of the path of arm 891 as the former is carried upwardly by the three-armed lever 883 so as to be clear of the impression hammer arm 891 when said impression hammer is released to make an impression.

During operations in which there is a feeding of the record strip, the lever 794 is first rotated clockwise, releasing the lever 883 and the link 889 to the tension of spring 884. This brings stud 890 into engagement with arm 891, in which position the parts remain until the hammer is raised for the impression. The spring 884 will then raise link 889 and carry stud 890 out of the path of arm 891, as heretofore explained. The hammer is then released, making the impression. This is followed by the return of lever 794 counter-clockwise, rotating lever 883 counter-clockwise to feed the record strip, and lowering link 889. Link 889 will be forced around the end of arm 891 against the tension of spring 894 during this lowering movement, and will come to rest in the position shown in Fig. 7.

A section of the printed record strip is visible through an opening in the casing covered by transparent material 897.

To make legible impression on the record strip and inserted slip, a continuous inking ribbon 714 (Fig. 7) is provided. This ribbon passes around guide rollers 731 supported by the printer frame, over blur shield 898, and over an inking roller 715 mounted on a stud 716. The ribbon is held taut by a tension roller 717 carried by a yoke pivoted on a stud 718.

The feeding means for the ribbon is not shown herein, but if a description of the same is desired, reference may be had to the parent Patent No. 1,865,147.

While the forms of mechanism herein shown and described are admirably adapted to fulfill the objects primarily stated, it is to be understood that it is not intended to confine the invention to the forms or embodiments herein disclosed, for they are susceptible of embodiments in various forms all coming within the scope of the claims which follow.

What is claimed, is:

1. In a machine of the class described, a feeding roller movable into and out of functioning position, a plurality of keys, a differentially movable member controlled by said keys, and means controlled by said differentially movable member for controlling the position of said feeding roller.

2. In a machine of the class described, a feeding roller movable into and out of functioning position, a plurality of keys, a differentially movable member controlled by said keys, a cam driven from said member, and means operated by said cam for controlling the position of said roller.

3. In a machine of the class described, a feeding roller movable into and out of functioning position, a plurality of keys for controlling the position of the roller during certain operations of the machine, and a total control lever for controlling the position of the roller during other operations of the machine.

4. In a machine of the class described, a feeding roller movable into and out of functioning position, a plurality of keys for controlling the position of the roller during certain operations of the machine, a total control lever, and separate means controlled by said lever for controlling the position of said feeding roller.

5. In a machine capable of printing a single item transaction and multiple item transactions together with their totals on an inserted slip, feeding means for said slip movable into and out of functioning position, an operating means for moving said feeding means out of functioning position at the end of a single item operation or total of a multiple item printing operation, and means for rendering said operating means ineffective during an operation in which the items of a multiple item transaction are printed.

6. The combination of a feeding roller movably mounted for movement into and out of functioning position, spring means normally tending to move said roller into functioning position, positive means operable during every operation of the machine, for moving said roller out of functioning position, and a key controlled means for preventing said positive means from moving said roller out of functioning position during certain operations.

7. The combination of a feeding roller, a lever, a pivoted arm on said lever, a driving means for said roller operable during each operation of the machine, a pin on said driving means adapted to co-operate with said arm to move said lever, and manipulative means for controlling the co-operative relation between said pin and arm.

8. The combination of a feeding roller, a lever, a pivoted arm on said lever, a driving means for said roller operable during each operation of the machine, a pin on said driving means adapted to co-operate with said arm to move said lever, a key controlled means for preventing co-operation between said pin and arm, a total control means, and means controlled thereby to position the key controlled means for establishing co-operation between said pin and arm.

9. The combination of feeding means normally movable into functioning position, impression means, means operable to release the feeding means for movement into functioning position in the first operation of a series of operations and to move it out of functioning position in the latter part of the last operation of such a series of operations, means operated upon movement of said feeding means into functioning position to disable part of the impression means during a subsequent operation and adapted to be rendered ineffective by movement of said feeding means out of functioning position, and means for preventing said operable means from moving said feeding means out of functioning position during all operations except the last operation of the series.

10. The combination of feeding means normally movable into functioning position, impression means, means operable to release the feeding means for movement into functioning position in the first operation of a series of operations and to move it out of functioning position in the latter part of the last operation of the series of operations, means operated upon movement of said feeding means into functioning position to disable part of the impression means during a subsequent operation and adapted to be rendered ineffective by movement of said feeding means out of functioning position, means for preventing said operable means from moving said feeding means out of functioning position during all operations except the last operation of the series, and keys for controlling said preventing means.

11. The combination of feeding means normally movable into functioning position, impression means, means operable to release the feeding means for movement into functioning position in the first operation of a series of operations and to move it out of functioning position in the latter part of the last operation of the series of operations, means operated upon movement of said feeding means into functioning position to disable part of the impression means during a subsequent operation and adapted to be rendered ineffective by movement of said feeding means out of functioning position, means for preventing said operable means from moving said feeding means out of functioning position during all operations except the last operation of the series, a key for controlling said preventing means, and a total control means superseding the control of said key to render said preventing means ineffective.

12. In a machine of the class described, the combination of a printing mechanism adapted to print a record strip, a feeding means for said record strip, an impression means for making an impression on said strip, and means controlled by said impression means for disabling said feeding means.

13. In a machine of the class described, the combination of a printing mechanism adapted to print a record strip, a feeding means for said record strip, an impression hammer adapted to make impressions on said record strip, means for disabling said impression hammer, and means for automatically disabling said record strip feeding means when said impression hammer is disabled.

14. In a machine of the class described, the combination of a printing mechanism adapted to print a record strip, a feeding means for said record strip, an impression hammer adapted to make impressions on said record strip, slidably mounted driving means for said feeding means, and means on said hammer for preventing rearward movement of said driving means while the hammer is in its normal home position.

15. In a machine of the class described, the combination of a printing mechanism adapted to print a record strip, including a feeding means for said record strip, an impression hammer adapted to make impressions on said record strip, driving means for said feeding means, means on said hammer for preventing movement of said driving means while the hammer is in its normal home position, means to move the driving means when the hammer is moved, means to move the driving means clear of the preventing means on the hammer, when the latter is moved, and additional means to move the feeding means so as to effect a feed of the record strip after the hammer has taken an impression.

16. In a machine of the class described, the combination of a printing mechanism adapted to print a record strip, a feeding means for said record strip, an impression means for making an impression on said strip, means controlled by said impression means for disabling said feeding means, and a plurality of keys for controlling the operativity of said impressions means during certain operations of the machine.

17. In a machine of the class described, the combination of a printing mechanism adapted to print a record strip, a feeding means for said record strip, an impression means for making an impression on said strip, means controlled by said impression means for disabling said feeding means, and a total control lever for controlling the operativity of said impression means during certain operations of the machine.

18. In a machine of the class described, the combination of a printing mechanism adapted to print a record strip, a feeding means for said record strip, an impression means for making an impression on said strip, means controlled by said impression means for disabling said feeding means, and a plurality of keys and a total control means functioning to control the operativity of said impression means.

19. In a machine of the class described, the combination of a printing mechanism adapted to print a record strip, a feeding means for said record strip, an impression means for making an impression on said strip, means controlled by said impression means for disabling said feeding means, a single item key for causing the impression means to be operated, and a multiple item key for rendering said impression means inoperative.

20. In a machine of the class described, the combination of a printing mechanism adapted to print a record strip, a feeding means for said record strip, an impression means for making an impression on said strip, means controlled by said impression means for disabling said feeding means, a single item key for causing the impression means to be operated, a multiple item key for rendering said impression means inoperative, and a total control means to cause the impression means to operate.

21. The combination of a feeding means, an impression hammer, a driving means, a spring for moving said driving means in one direction, and a stop member on said hammer for restraining said spring while the hammer is in its home position.

22. The combination of a feeding means, an impression hammer, a driving means, a spring for moving said driving means in one direction, a stop arm on said hammer, a member operatively connected to said driving means, a pin on said member adapted to co-operate with said arm, a spring for holding said pin and arm in functioning relation, and a guide for moving said pin and arm out of functioning relation as the hammer is moved from its home position.

23. The combination of a feeding means, an impression hammer, a driving means, a spring for moving said driving means in one direction, a stop arm on said hammer, a shoulder on said arm, a link operatively connected to said driving means, a pin on said link adapted to co-operate with said shoulder to restrain said spring when the hammer is in its home position, and a pin co-operating with said link to move the first mentioned pin out of co-operative relation with said shoulder as the hammer is moved out of home position.

24. The combination of a feeding means, an impression hammer, a driving means, a spring for moving said driving means in one direction, a stop arm on said hammer, a shoulder on said arm, a link operatively connected to said driving means, a pin on said link adapted to co-operate with said shoulder to restrain said spring when the hammer is in its home position, and a pin co-operating with said link to move the first mentioned pin out of co-operative relation with said shoulder as the hammer is moved out of home position, and for guiding said first mentioned pin and shoulder into co-operative relation as the hammer returns to home position.

In testimony whereof I affix my signature.

BERNIS M. SHIPLEY.